United States Patent [19]

Miyaji et al.

[11] Patent Number: 5,272,755
[45] Date of Patent: Dec. 21, 1993

[54] PUBLIC KEY CRYPTOSYSTEM WITH AN ELLIPTIC CURVE

[75] Inventors: Atsuko Miyaji, Kawachinagano; Makoto Tatebayashi, Takarazuka, both of Japan

[73] Assignee: Matsushita Electric Industrial Co., Ltd., Osaka, Japan

[21] Appl. No.: 904,944

[22] Filed: Jun. 26, 1992

[30] Foreign Application Priority Data

Jun. 28, 1991 [JP] Japan ................................ 3-158205

[51] Int. Cl.$^5$ .......................................... H04L 27/30
[52] U.S. Cl. ......................................... 380/30; 380/9; 380/21; 380/28; 380/43; 380/49
[58] Field of Search ................... 380/9, 28, 30, 49, 50, 380/21, 43

[56] References Cited

U.S. PATENT DOCUMENTS

| | | | |
|---|---|---|---|
| 4,424,414 | 1/1984 | Hellman et al. | 380/30 |
| 4,495,082 | 1/1985 | Mita et al. | 252/194 |
| 4,668,103 | 5/1987 | Wilson | 380/30 |
| 4,995,082 | 2/1991 | Schnorr | 380/30 X |
| 5,010,573 | 4/1991 | Musyck et al. | 380/28 |
| 5,054,066 | 10/1991 | Riek et al. | 380/30 |
| 5,146,500 | 9/1992 | Maurer | 380/30 |
| 5,150,411 | 9/1992 | Maurer | 380/30 |

FOREIGN PATENT DOCUMENTS

| | | |
|---|---|---|
| 59-107658 | 6/1984 | Japan . |
| 63-52536 | 3/1988 | Japan . |
| 1-119144 | 5/1989 | Japan . |
| 3-505033 | 10/1991 | Japan . |

OTHER PUBLICATIONS

E. Kranakis, *Primality and Cryptography;* (John Wiley & Sons, 1986, Chichester); pp. 141–169.

*Primary Examiner*—Bernarr E. Gregory
*Attorney, Agent, or Firm*—Price, Gess & Ubell

[57] ABSTRACT

The present invention provides a public key cryptosystem with an elliptic curve which comprises the steps of informing public data, selecting first and second privacy keys at the end of first and second users, mutually notifying numbers calculated by the public data and the first and second privacy keys, calculating a common key by using the first privacy key and the number from the second user or by using the second privacy key and the number from the first user, ciphering transmission data using the common key by either the first or second user, and deciphering the ciphered data using the common key by the other use. The step of informing public data includes the stages of choosing d as a positive integer such that gives an imaginary quadratic field $Q((-d))^{\frac{1}{2}}$ a small class number, choosing p as a prime number such that $4*p-1=d*$square number, so that an elliptic curve E over GF(p) will have a j-invariant as a solution modulo p for a class polynomial $H_d(x)=0$ which is fixed by d, finding an order of a point other than a zero element from $E_1(GF(p))$, choosing an elliptic curve E over (GF(p)) having exact p order, and choosing an element other than the zero element of E(GF(p)) as a base point.

6 Claims, 6 Drawing Sheets

Data $\quad h_1 = 101_2$

Common key $\quad k = 100_2$

```
      101₂              101₂              101
  ×   100₂         +    100₂         f    100
  ─────────         ─────────         ─────────
     10100₂             1001₂              001
```

PUBLIC KEY CRYPTOSYSTEM WITH AN ELLIPTIC CURVE

BACKGROUND OF THE INVENTION

1. Field of the Invention

The present invention relates to a privacy communication technique for transmitting numerical data through a public network or a broadcasting network, more particularly, to a technique using an elliptic curve thereto.

2. Description of Related Arts

A public key cryptosystem facilitates the management of cipher keys for respective correspondents, while it makes deciphering cryptography more intricate. In addition, the public key enables only the designated correspondents to decipher data through a private communication, should the data be eavesdropped. Thus, it is an essential technique to transmit anonymous data as well as to validate and identify the correspondents through the public network. Such a private communication has been already in practical use, and application is known as a broadcasting system in which programs are available only to those who are provided with deciphering equipments, and as rental laser disks which are available only to those who have deciphering equipments.

Explained in the followings is the privacy communication through the public key cryptosystem and difficulty of deciphering which is the basis for reliability thereof, and such reliability is dependent on difficulty of the discrete logarithm problem over finite abelian groups. "Intractable Problems in Number Theory", E. Bach, Advances in Cryptology-Proceedings of Crypto '88. Lecture Notes in Computer Science, 403(1988), pages 77–93, Springer-Verlag. discusses such difficulty.

<Notation>

- p: a prime number
  Galois Field(p), or GF(p): a finite field with p elements, or a complete residue system modulo p
- g: a primitive root of GF(p), or an integer such that becomes 1 when raised to the p-1th power as a residue modulo p
- a: an arbitrary positive integer, $1 \leq a \leq p - 1$
- b: an arbitrary positive integer, $1 \leq b \leq p - 1$
- $\alpha$: a residue of $g^a$ modulo p, $\alpha = g^a \pmod{p}$
- $\beta$: a residue of $g^b$ modulo p, $\beta = g^b \pmod{p}$
- k: a residue of g to the (a × b)th power,
  $k = g^{a-b} \pmod{p}$ Although it is easy to find, $\alpha$ using g, p and a, it is quite difficult, even with help of sophisticated computers, to find a using g, p, and $\alpha$ when p is a large prime number. In other words, it is difficult to find an index using a residue, a primitive root, and an element, as is explained in "AN INTRODUCTION TO THE THEORY OF NUMBERS", G. H. HARDY & E. M. WRIGHT, OXFORD UNIVERSITY PRESS.

In the following, procedures of the privacy communication is explained with referring to FIG. 1. In the privacy communication using a public network, p=11 and g=2, or the public keys, have been previously provided to users A and B. Each of them selects and withholds a privacy key, or arbitrary integers a=4 and b=8, respectively. The user A notifies $\alpha$=5 to the user B while the user B notifies $\beta$=3 to the user A. Then with the following congruences, they find k=4, or a common key which is used and withheld between two of them.

$$k = g^{ab}$$
$$= (g^a)^b \pmod{p} = \alpha^b \pmod{p}$$
$$= (g^b)^a \pmod{p} = \beta^a \pmod{p}$$

As previously mentioned, because it is difficult to find k using p, g, $\alpha$, and $\beta$, it is almost impossible to find k unless one knows a and b, which means that a third party is not able to understand the data should he/she receive them.

The privacy communication flexibly replaces the users(adding new users/cancelling the users). More precisely, the privacy communication will be also available to users C and D when each of them selects and withholds the privacy key, or arbitrary integers c and d, respectively, and the common keys $g^{a-b}$, $g^{a-c}$, $g^{a-d}$, $b^{b-c}$, $g^{b-d}$, and $g^{c-d}$ are exchanged among the users A through D. In addition, reliability is further enhanced by replacing the privacy key regularly, for instance, replacing a with a' in the first 6 months, and with a" in the next 6 months. It also should be noted that coincidence(a=b) of the privacy keys is decreased in reverse proportion to the largeness of the prime number.

The privacy transmission is also applicable to image data transmission such as one through facsimile machines. For instance, in a subscription television service(STV), the privacy transmission coupled with deciphering equipments provided to subscribers makes it possible to transmit the data only to those who have paid the charges. Also, installing such deciphering equipments in the seats of jetliners contributes to loaning portable data storage media storing ciphered image/audio data such as laser disks and magnetic tapes in terms of preventing the stealing and failure in returning of these media. More precisely, since each jetliner or air route is provided with different common keys, ciphering methods, and models of deciphering equipments, these media are repeatable only when they are set into the appropriate deciphering equipments. Another option for the prevention of stealing and failure in returning of these media would be to provide an automatic data cancelling function that cancels the data once the data are deciphered. However, the latter is not preferable because providing such a function to each deciphering equipment may result in adding unnecessary weight to the jetliners as well as receiving bad reputation from the passengers.

Today's cable/radio transmission system essentially transmits the data in bits consisting of codes 1 and 0 in order to prevent noise, and because of hardware and software programs facility as well as the binary notation applied in most of the computers. Even an AF modulation analogue signal is converted so as to have a wave height in every time unit for the bit transmission. Therefore, the data transmission is acknowledged as a sequential transmission of an integer expressed in the binary notation if the data are divided into units.

Accordingly, having previously fix the number of bits in the unit makes it possible to transmit the data as numerical data $h_1, h_2, \ldots h_i$. Therefore, ciphering $h_1, h_2, \ldots h_i$ with k enables the users to exploit the privacy communication. Three conceivable ciphering methods are, for instance, shown in FIG. 2. In the first method, the data $h_1, h_2, \ldots h_i$ are multiplied with k, and in the second method, the data $h_1, h_2, \ldots h_i$ are added to k. In the third method, the data $h_1, h_2, \ldots h_i$ are disturbed with k, in other words, provided that k has the same bit length as that of the data $h_1, h_2, \ldots h_i$, "1" in k reverses the corresponding bits in the data $h_1, h_2, \ldots h_i$ while "0" bit allows the corresponding bits to remain the same. Such data are easily deciphered by the users possessing k, while the third party has a hard time to decipher such data unless he/she knows k even when these data are eavesdropped by or happened to be transmitted to him/her.

Further improvement, modification, and various application have been continuously added to the public key cryptosystem in order to answer the following necessities for;

(1) having an integer with an order as large as possible to meet advancement of the computers capable of finding a large prime number, although a primitive root thereof can not be found easily with these computers.

(2) maintaining deciphering difficult by exploiting the developments of massive computers, and by applying the theory of numbers such as a decomposition method, a higher-order reciprocity, and a prime number theory as fully as possible.

(3) reducing steps and calculations in ciphering the data with the common key due to a capacity limit of hardware.

(4) minimizing the bit length of the ciphered data.

(5) validating/identifying the correspondents in order to prevent the transmission under an alias.

More precisely, not only p and g are replaced regularly, but also p is chosen so that $p+1$ and $p-1$ have also prime factors for above (1) and (2). For (3) and (4), a ciphering method with reduced calculations and maintaining difficulty in deciphering has been studied, since the first ciphering method mentioned above requires myriads of calculations, and results in generating the common key with many digits, while the second and third methods facilitate deciphering. Also researches are being carried out on more sensitive deciphering method through which the data are not deciphered until the common key is proved intact for (5). Also, more compact and inexpensive deciphering equipments as well as improved bit distributors are being developed as is introduced in "Gendai Ango Riron", Shinichi Ikeno and Kenji Koyama, Denshintsushin Gakkai. Moreover, the public key cryptography using a common cipher key and a common decipher key, and the transmission method thereof are being developed. Therefore, it is to be noted that the common keys are used both in ciphering and deciphering hereinafter.

In the following, mathematical and programmatic aspects of the discrete logarithm problem are described.

In order to increase the speed and enhance reliability in the public key cryptosystem, a technique to construct the difficult discrete logarithm problem is indispensable. Followings are examples of such construction of the discrete logarithm problem in the finite field(hereinafter referred to DLP) and that in the elliptic curve(-hereinafter referred to EDLP).

| DPL |
|---|
| <Notation> |
| q: a power of a large prime number |
| GF(q): a finite filed with q element |
| g: a primitive root to GF(q) |

Let y be an element of GF(q). Then, DLP is a problem of finding an integer $X (0 \leq x \leq q-1)$ such that $y = g^x$ if such an integer x exists.

In order to make DLP difficult for the third party, it is necessary to choose q so that $q-1$ has prime factors having more than or equal to 160 digits. The same logic is applied here as the one in case of the residue system modulo p, wherein it is necessary to choose a large prime number as p, and an integer having a large order as g, or to choose p so that $p-1$ has a large prime factor. Since sophisticated computers of these days choose such q easily, it is quite easy to construct such DLP as well.

However, for such DLP, study on mathematical properties such as a property of factors has been pursued and various solutions have been presented in a book such as "Fast Evaluation of Logarithms in Fields of Characteristic Two", IEEE TRANSACTIONS ON INFORMATION THEORY, pages 587-584, IT-30(1984). Thus, DLP is solvable in shorter time these days if DLP is constructed over a small finite field, which, at the same time, means that deciphering is getting easier.

A general theory of an algebraic aspect of the finite field is on "MODERN ALGEBRA", B. L. Van der Waerden, Springer.

EDLP

Another method to construct the discrete logarithm problem is to apply an elliptic curve as the finite abelian group, or construct EDLP as is introduced in "A Course in Number Theory and Cryptography", N. Koblitz, Springer-Verlag, 1987, and "Use of Elliptic Curves in Cryptography", V. Miller, Proceedings of Crypto '85, Lecture Notes in Computer Science, 218(1986), pages 417-426, Springer-Verlag.

Since the study of solutions on EDLP have not been carried out much compared to that on DLP, applying the elliptic curve to the public key cryptosystem makes it possible to cipher and decipher the data more easily and faster without reducing reliability thereof.

The elliptic curve means an abelian manifold, or a projective algebraic curve with an irreducible and a non-singular genus 1.

Let the characteristic of a finite field $K \neq 2, 3$,
and let a and b be elements of K
then, it is expressed as in an equation $$Y^2 = X^3 + a \times X + b$$

Further reference of pure mathematic theory is on "INTRODUCTION TO THE ARITHMETIC THEORY OF AUTOMORPHIC FUNCTIONS", CHAPTER 4 ELLIPTIC CURVES, Goro Shimura, Iwanami Shoten, "EINFUEHRLING IN DIE THEORIE DER ALGEBRASCHEN ZAHLEN UND FUNKTIONEN", KAPITEL IV Algebraische Funktionen Ueber Den KomplexenZahlkoeper, MARTIN EICHLER, BIRKHAEUSER BERLAG.

In the followings, explanation of the basic mathematics is quoted from "On Ordinary Elliptic Curve Cryptosystems", Abstract of Proceedings of ASIA-CRYPTO, '91, 1991, A. Miyaji. one of the investors of the present invention for further explanation.

QUOTE

Notation p: a prime r: a positive integer q: a power of p $F_q$: a finite field with q elements
K: a field (include a finite field)
ch(K): the characteristics of a field K
$K^r$: the multiplicative group of a field K
$\bar{K}$: a fixed algebraic closure of K
E: an elliptic curve
   If we remark a field of definition K of E, we write E/K.
A: the cardinality of a set A
o(t): the order of an element t of a group
Z: the ring of integers Background on Elliptic Curves We briefly describe some properties of alliptic curves that we will use later. For more information, see [Sil]. In the following, we denote a finite field $F_q$ by K.

Basic Facts

Let E/K be an elliptic curve given by the equation, called the Weierstrass equation, $$E: y^2 + a_1xy + a_3y = x^3 + a_xx^2 + a_4 + a_6 \quad (a_1, a_3, a_2, a_4, a_6 \in K).$$

The j-invariant of E is an element of K determined by $a_1, a_3, a_2, a_r$ and $a_6$. It has important properties as follows.

(j-1) Two elliptic curves are isomorphic (over $\bar{K}$) if and only if they have the same j-invariant.

(j-2) For any element $j_0 \in K$, there exists an elliptic curve defined over K with j-invariant equal to $j_0$. For example, if $j_0 \neq 0, 1728$, we let $$E: y^2 + xy = x^3 - 36/(j_0 - 1728)x - 1/(j_0 - 1728).$$

Then j-invariant of E is $j_0$.

The Group Law

A group law is defined over the set of points of an elliptic curve, and the set of points of an elliptic curve forms an abelian group. We denote the identity element $\infty$. After this, for $m \in Z$ and $P \in E$, we let $$mP = P + \ldots + P \text{ (m terms) for } m > 0,$$

$$OP = \infty, \text{ and}$$

$$mP = (-m)(-P) \text{ for } m < 0.$$

The set of K-rational points on the elliptic curve E, denotes E(K), is $$E(K) = [(x,y) \in K^2 | y^2 + a_1xy + a_3x^3 + a_2x^2 + a_4x + a_6.]U[\infty]$$

E(K) is a subgroup of E and a finite abelian group. So we can define the discrete logarithm problem over it.

[Sil] J. H. Silverman, "The Arithmetic of Elliptic Curves", GTM106, Springer-Verlag, New York, 1986
UNQUOTE Explained in the followings with referring to FIG. 7 is a flow of a ciphering method used through the privacy communication in the public key cryptosystem with an elliptic curve, which is similar to the privacy communication based on ElGamal ciphering in the finite field.

<Notation>
E: an elliptic curve
q: a power of p ($p^r$)
E(GF(q)): the group of elements of GF(q) on the elliptic curve E defined over GF(q)

1) Key generation

Select E defined over GF(q). Comparison between GF(q) and E(GF(q)) are as follows:

| GF(q) | E(GF(q)) |
|---|---|
| unit element: 1 | unit element: infinite point |
| multiplication | addition |
| $y = g^x$ | $Y = P + \ldots + P$ (x terms) $= xP$ |
| (y and g are elements of GF(q), x is an integer) | (Y and P are elements of E(GF(q)), x is an integer) |
| result of the multiplication is a scalor product | $P_1 + P_2$ represents a point $P_3$, which is symmetric with respect to the x-axis to $P_3$, an intersection between E and a straight line passing $P_1$ and $P_2$ as shown in FIG. 4. (When $P_1 = P_2$, the straight line passing $P_1$ and $P_2$ represents a tangential line of E at $P_1$) |

Let $P_1$ be an element of E(GF(q)) with a large order and having the same property as g in GF(q), which means that P and E(GF(q)) are the public keys. The user B selects an integer $x_B$ and computes $Y_B$, $$Y_B = x_B P \quad [1]'$$

Then the user B withholds $X_B$ as the privacy key while informs $Y_B$ to all the other users.

2) Ciphering

Suppose the user A sends a message M to the user B through the privacy communication.

Having secretly selected a random number k, the user A produces two sets of cryptography $C_1$ and $C_2$ from M using k and $Y_B$.

Thus, $$C_1 = kP \quad [2]'$$

$$C_2 = M + kY_B \quad [3]'$$

Then, the user A sends $C_1$ and $C_2$ to the user B.

3) Deciphering

Having received $C_1$ and $C_2$, the user B finds M using $$M + x_B C_1 = C_2 \quad [4]'$$

It is to be noted that all expressions [1]', [2]', [3]', and [4]' are proceeded in E(GF(q)), and M, $Y_B$, and P are elements of E(GF(q)).

Concerning the calculation of $x_B$ and $Y_B(x_0, y_0)$, or one demential numerical data and quadratic numerical data/an element of the elliptic curve, other data are provided so that $Y_B(x_0, y_0)$ can be found either with $x_0$ or $y_0$, or a method that uses either $x_0$ or $y_0$ is applied.

Replacing the elements of the finite filed with those of the elliptic curve, and replacing the multiplication in the finite field with the addition in the elliptic curve make it possible to convert DLP into EDLP, therefore enables the public key cryptosystem to have its reliability based on difficulty of EDLP. In other words, EDLP is: let P be a base point(=g in DLP) of E(GF(q)), and find an integer x such that Y=x*P, if such integer x exists.

Researches on application of EDLP to the public key cryptosystem were carried out for the following reasons:

a) Given the fact that an effective solution for EDLP has been under the quest, GF(q) can be smaller, therefore making it possible to increase the speed by decreasing the calculations for ciphering and deciphering while maintaining reliability.

b) In order to maintain reliability of the public key cryptosystem, the finite abelian groups should be replaced regularly. For instance, it should be replaced at the renewal of the contracts in STV, and different finite abelian groups should be applied to respective jetliners. Since each q has a single finite field when the finite field is used for the privacy communication, calculation necessary for ciphering/deciphering, or an algorithm, should be changed in accordance with the finite abelian groups. More precisely, a calculation over GF(7) is proceeded per block consisting of 1-byte(8 bits), while a calculation over GF(17) is proceeded per 2 blocks. On the other hand, since each q has abundant elliptic curves over GF(q), the elliptic curve can be replaced without replacing the finite field used as the base for ciphering/deciphering.

However, because it is difficult to find the number of the elements of GF(q) of the elliptic curve, denoted as #E(GF(q)), finding #E(GF(q)) such that is divisible by a large prime number having more than or equal to 30 digits becomes more difficult. "A Course in Number Theory and Cryptography" also deals with such difficulty.

In conclusion, it can be said that when constructing the public key cryptosystem with an elliptic curve, it is necessary to construct the elliptic curve so that #E(GF(q)) has a large prime factor having more than or equal to 30 digits. The same logic is applied here as the one explained in that $q-1$ needs to have a large prime factor.

In the following, the method to construct an elliptic curve applicable as a finite abelian group is described.

EXAMPLE 1

Since a supersingular elliptic curve as shown in FIG. 3 is discussed here, the definition of supersingular is quoted from "On Ordinary Elliptic Curve Cryptosystems", A. Miyaji.

QUOTE

Let $E/F_q$ be an elliptic curve. If E has the properties $E[p^t] = [\infty$ for all integer $t \geq 1$, then we say that E is supersingular. Otherwise we say that E is ordinary.

Remark Let E be a supersingular elliptic curve. The definition of supersingular says that o(T) is prime to ch(K) = p for all $T \in E(K)$

UNQUOTE

Further reference is on "The implementation of elliptic curve cryptosystems", A. Menezes, Advances in Cryptology-Proceedings of Auscrypt '90, Lecture Notes in Computer Science, 453(1990), pages 2–13, Springer-Verlag.

For convenience' sake, a method to construct the supersingular elliptic curve explained in the following is divided into 2 following segments.

1) Determination of an prospective elliptic curve.

Let $E_1$, $E_2$, and $E_3$ be supersingular elliptic curves over GF(2).

Thus, expressed as $E_1: y^2 + y = x^3 + x + 1$ $E_2: y^2 + y = x^3 + x$ $E_3: y^2 + y = x^3$ Let $E_i(GF(2^m))$ be a group consisting of the elements of $GF(2^m)$. (i = 1.3)($\infty$ = infinite point)

Thus, expressed as $E_1(GF(2^m)) = \{x, y \in GF(2^m) | y^2 + y = x^3 + x + 1\} U\{\infty\}$ $E_2(GF(2^m)) = \{x, y \in GF(2^m) | y^2 + y = x^3 + x\} U\{\infty\}$ $E_3(GF(2^m)) = \{x, y \in GF(2^m) | y^2 + y = x^3\} U\{\infty\}$ As previously mentioned, addition is defined over $E_i(GF(2^m))$ so that it is converted into a finite abelian group having $\infty$ as a zero element. Given these conditions and by letting m be an odd number, $\#E_i(GF(2^m))$ is found with expressions below, although the calculation is somewhat difficult in general. Such calculation as $\#E_i(GF(2^m))$ is explained in "The Arithmetic of Elliptic Curves" GTM106, J. H. Silverman, Springer-Verlag New York 1986.

| | |
|---|---|
| $\#E_1(GF(2^m))$ | $2^m + 1 - 2^{(m+1)/2}$ in case (m ≡ 1,7(mod 8)) |
| | $2^m + 1 + 2^{(m+1)/2}$ in case (m ≡ 3,5(mod 8)) |
| $\#E_2(GF(2^m))$ | $2^m + 1 + 2^{(m+1)/2}$ in case (m ≡ 1,7(mod 8)) |
| | $2^m + 1 - 2^{(m+1)/2}$ in case (m ≡ 3,5(mod 8)) |
| $\#E_3(GF(2^m))$ | $2^m + 1$ |

2) Determination of a suitable extension degree m

It is well known that EDLP is easily solved unless the order of the base point P is divisible by a large prime number having more than or equal to 30 digits. The solution is presented in "An Improved Algorithm for Computing Logarithms over GF(p) and its Cryptographic Significance", S. C. Pohilg and M. E. Hellman, IEEE TRANSACTION ON INFORMATION THEORY, pages 106–110, IT-24(1978).

As was mentioned above, a necessary and sufficient condition for P is that #E(GF(q)) is divisible by a large prime number. Thus, it is necessary to find an extension degree m such that $\#E_i(GF(2^m))$ is divisible by a large prime number. (i = 1–3)

A model of the elliptic curve construction is presented in the followings.

$\#E_3(GF(2^m))$ is factorized and followings are found:

let m = 191 $\#E_3(GF(2^m)) = 2^{191} + 1 = 3 * p_1$ let m = 251 $\#E_3(GF(2^m)) = 2^{251} + 1 = 3 * 238451 * p_2$ ($p_1$ and $p_2$ are prime numbers)

Proof of $p_1$ and $p_2$ being prime numbers is given from the fact that $p_1$ and $p_2$ are factors of a power of 2 plus 1, and therefore, that they are represented in abnormal forms, for instance, $2^{191} + 1$ and $2^{251} + 1$ are represented as $2 \cdot 191 \cdot m + 1$ and $2 \cdot 251 \cdot m + 1$, respectively. Also, it is proved by a method introduced in "Math Comp., 42, 165, pp297–330(January 1984) H. Cohen and H. W. Lenstra.

It is for this reason that the public key cryptosystem is established by constructing either EDLP to the base point P, that is, an element whose order is $p_1$ over $E_3(GF(2^{191}))$, or EDLP to the base point P, that is, an element whose order is $p_2$ over $E_3(GF(2^{251}))$, and by applying the difficulty thereof to reliability of the public key cryptosystem.

In 1991, however, a solution for EDLP, so-called the MOV reduction, was presented, in which EDLP was reduced to DLP through a isomorphic group. With the MOV reduction which gives subexponential algorithm to DLP on supersingular elliptic curve, reliability on difficulty EDLP explained above is decreased. The MOV reduction is explained in "Reducing Elliptic Curve Logarithms to Logarithms in a Finite Field", A. Menezes, S. Vanstone, and T. Okamoto, Proceedings of the 22nd Annual ACM Symposium on the Theory of Computing, pages 80-89, 1991.) The MOV reduction essentially uses an algebraic geometry theory or an algebraic integer theory, for instance, Weil pairing. Explanation of the MOV reduction is quoted from "On Ordinary Elliptic Curve Cryptosystems", A. Miyaji below. Books such as "MODERN ALGEBRA" also include definition and theories of isomorphic, fields, rings, and groups. "The Arithmetic of Elliptic Curves" and "THEORY OF NUMBERS" also include the detailed explanation of the integer theory.

QUOTE

The Weil pairing

For an integer $m \geq 0$, the m-torsion subgroup of E, denoted E(m), is the set of points of order m is E, $$E[m] = [P \epsilon E | mP = \infty].$$

We fix an integer $m \geq 2$, which is prime to $p = ch(K)$. Let $\mu_m$ be the subgroup of the mth roots of unity in $\overline{K}$.

The Weil $e_m$-Pairing is a pairing defined over $E[m] \times E[m]$ $$e_m : E[m] \times E[m] \rightarrow \mu_m.$$

For a definition of the Weil $e_m$-pairing, see [Sil]. We list some useful properties of the Weil $e_m$-pairing.

For E[m]   S, T, $S_1$, $S_2$, $T_1$, $T_2$, (e-1) Bilinear:

$$e_m(S_1 + S_2, T) = e_m(S_1, T)e_m(S_2, T)$$

$$e_m(S, T_1 + T_2) = e_m(S, T_1)e_m(S, T_2);$$

(e-2) Alternating:

$$e_m(S, T) = e_m(S, T)^{-1};$$

(e-3) Non-degenerate:

If $e_m(S, T) = 1$ for all $S \epsilon E[m]$, then $T = \infty$;

(e-4) Identity:

$$e_m(S, S) = 1 \text{ for all } S \epsilon E[m].$$

3 Reducing EDLP to DLP in a finite field

In this section, we briefly describe the MOV reduction of EDLP via Weil pairing. For more information, see [MOV].

First we give the definition of EDLP.

EDLP([Ko2])

Let $E/F_q$ be an elliptic curve and P be a point of $E(F_q)$. Given a point $R \epsilon E(F_q)$, EDLP on E to the base P is the problem of finding an integer $x \epsilon Z$ such that $xP = R$ is such an integer x exists.

Next we mention about embedding the subgroup $<P> \subseteq E(K)$ generated by a point P into the multiplicative group of a finite extension field of K. This embedding is constructed via Weil pairing. It is the essence of the MOV reduction. In the following, we denote a finite field $F_q$ by K and fix an elliptic curve E/K and a point $P \epsilon E(K)$. We further assume that $o(P) = m$ is prime to $p = ch(K)$.

Embedding

Let Q be another point of order m such that E[m] is generated by P,Q. Let $K^r$ be an extension field of K containing $\mu_m$. We can define a homomorphism $$f := <P> \rightarrow K^r.$$

by setting $$f(nP) = e_m(nP, Q).$$

From the definition of Weil pairing, it follows easily that f is an injective homomorphism from $<P>$ into $K^r$. As $K^r \supset \mu_m$, the subgroup $<P>$ of E is a group isomorphism to the subgroup $\mu_m$ of $K^r$.

Summary of the MOV reduction

We summarize the MOV reduction of EDLP, which finds in integer x such that $R = xP$ for a given $R \epsilon E(K)$, with the above embedding.

We can check in probablistic polynomial time whether $R \epsilon <P>$ or not. So we assume that $R \epsilon <P>$. Since m is prime to p, we can construct an injective homomorphism f from $<P>$ into $K^r$ as stated above. Then the problem is equal to find an integer x such that $f(R) = f(P)^x$ for a given $f(R)$, $f(P) \epsilon K^r$. In this way, we can reduce EDLP to DLP in an extension field $K^r$ of K.

[Ko2] N. Koblitz, "A course in Number Theory and Cryptography", GTM114, Springer-Verlag, New York (1987).

[MOV] A. Menezes, S. Vanstone and T. Okamoto, "Reducing elliptic curve logarithms to logarithms in a finite field", to appear in Proc. STOC'91.

[Sil] J. H. Silverman, "The Arithmetic of Elliptic Curves", GTM106, Springer-Verlag, New York, 1986

UNQUOTE

As was explained above, EDLP to the base point $P \epsilon E(GF(q))$ can be solved by reducing it to DLP over an extension field $GF(q^r)$ of $GF(q)$ when the order of P and q are not relatively prime. Particularly, EDLP on the supersingular elliptic curve is reduced to an extension field of degree 6 of GF(q) at most.

Applying the MOV reduction to the supersingular elliptic curve makes EDLP easier. In other words, difficulty of DLP over $E_3(GF(2^n))$ is as same as that over $GF(2^{2n})$. Moreover, application of the theory of numbers, researches on solutions, development of massive computers make it necessary for 2n to have more than 516 to maintain reliability against the attack of "Fast Evaluation of Logarithms in Fields of Characteristics Two". However, having n with more than 256 makes it somewhat difficult to increase the speed due to the increase of ciphering/deciphering calculations.

Since the elliptic curve over GF(2) is extended to that over $GF(2^n)$, a field of definition with n bits provides only as many elliptic curves as the supersingular elliptic curves over GF(2), that is, 3. Furthermore, in order to let #$E(GF(2^n))$ be more than or equal to 30 digits, #$E(GF(2^n))$ needs to be factorized. However, the factorization becomes difficult considerably in accordance with the largeness of n, therefore, some inconvenience may be caused due to these time-consuming calculations.

EXAMPLE 2

In the following, a method to construct an elliptic curve with respect to the MOV reduction is explained with referring FIG. 5, which means that the supersingular elliptic curve is not used in Example 2. An example is introduced in "Non-supersingular Elliptic Curves for Public Key Cryptosystems.", T. Beth. F. Schaefer, Advances in Cryptology-Proceedings of Eurocrypt '91, Lecture Notes in Computer Science, pages 316-327, 547(1991).

For convenience' sake, the method is divided into 2 following segments.

1) Determination of a prospective elliptic curve

Choose GF(2). Let $E_4$ and $E_5$ be non-supersingular elliptic curves.

Thus, expressed as $$E_4: y^2 + xy = x^3 + x^2 + 1$$

$$E_5: y^2 + xy = x^3 + 1$$

Let $E_i(GF(2^m))$ be a group consisting of the elements of $GF(2^m)$. (i=4,5)

They are expressed as $$\#E_4(GF(2^m)) = 1 + 2^r - \{(1+(-7)^{\frac{1}{2}})/2\}^m - \{(1-(--7)^{\frac{1}{2}})/2\}^m$$

$$\#E_5(GF(2^m)) = 1 + 2^r - \{(1+(-7)^{\frac{1}{2}})/2\}^m - \{(-1+(--7)^{\frac{1}{2}})/2\}^m$$

2) Determination of a suitable extension degree m

Let m be an extension degree for each $E_i$(i=4,5) such that satisfies following 2 conditions:

[Condition 1]

$\#E_i(GF(2^m))$ is divisible by a large prime number. (i=4, 5)

[Condition 2]

Let p be the greatest prime factor of $E_i(GF(2^m))$, and let t be a sufficiently large positive integer, so that $2^{mk}-1$ do not have p as a prime factor, where k is a positive integer smaller than or equal to t. (i=4, 5)

With Condition 2, the extension degree becomes larger than or equal to t when EDLP over $E_i(GF(2^m))$ is reduced to that over $GF((2^m)^t)$. It is to be noted that the larger t becomes, the more difficult EDLP becomes.

A model of the elliptic curve construction is presented in the followings $\#E_4(GF(2^m))$ is factorized and following is found:

$$m = 107 \quad \#E_4(GF(2^m)) = 2*p_3 \text{ ($p_3$ is a prime number)}$$

Further, it is proved with a computer that $2^{mk}-1$ do not have $p_3$ as a prime factor when k=1.6.

It is for this reason that the public key cryptosystems is established by constructing in EDLP to the base point P, or the element whose other is $p_3$, is and by applying the difficulty thereof to the reliability of the public key cryptosystems.

The solution introduced in "An Improved Algorithm for Computing Logarithms over GF(p) and its Cryptographic Significance" is applied to the conventional elliptic curves, which is more effective than reducing EDLP to DLP, therefore, it is necessary for the public key cryptosystem with the conventional elliptic curves over $GF(2^n)$ to let n be a number more than or equal to 100 in order to maintain reliability thereof. However, with advancement of the computers, n needs to be larger, therefore making it somewhat difficult to increase the speed due to the increase of ciphering/deciphering.

As was explained in Example 1, since the elliptic curve is extended from GF(2) to $GF(2^n)$, the field of definition with n bits provides only as many elliptic curves as non-supersingular elliptic curves over GF(2), that is, 2. Furthermore, in order to let $\#E(GF(2^n))$ be a number such that divisible by a large prime number having more than or equal to 30 digits, $\#E(GF(2^n))$ needs to be factorized. However, the factorization becomes difficult considerably in accordance with the largeness of n, therefore making it difficult to increase the speed.

SUMMARY OF THE INVENTION

The present invention has an object to provide a public key cryptosystem with an elliptic curve to which the MOV reduction can not be applied to EDLP.

The present invention has another object to provide a public cryptosystem with an elliptic curve in which a field of definition can provide as many elliptic curves as the number of bits.

The above object is fulfilled by a public key cryptosystem realized by a calculation between an element of E(GF(p)) and one of numerical data and identification code, when let p be a prime number, E(GF(p)) be a group of elements of a finite field GF(p) on an elliptic curve E defined over GF(p), and let E be an elliptic curve such that E(GF(p)) has p elements, and the public key cryptosystem is characterized in that reliability thereon is based on difficulty of the discrete logarithm problem defined over E(GF(p)).

Such an elliptic curve is constructed as follows: Let d be an positive integer such that is more than or equal to 3, and that gives an imaginary quadratic field $Q((-d)^{\frac{1}{2}})$ a small class number in order to facilitate the construction of a class polynomial $H_d(X)$, and let p be a prime number such that 4*p-polynomial $1 = d*$square number. Then $j_0$, or a solution of $H_d(X)=0$ (modulo p), gives the j-invariant of an elliptic curve E over GF(p) and there exists two elliptic curves E through identification of modulo GF(p)-isomorphism:

$$E_0: y^2 = x^3 + 3c^2ax + 2c^3a \quad (c = \text{non-quadratic residue})$$

$$E_1: y^2 = x^3 + 3ax + 2a$$

$$a = j_0/(1728 - j_0)$$

Given $E_1(GF(p)) \ni X_1$, $E_0(GF(p)) \ni X_0$ (other than the zero element), and each of them multiplied by p, the elliptic curve with exactly p elements is the one that has the zero element as the multiplication result.

The proof of such construction based on a mathematical theory is quoted from "On Ordinary Elliptic Curve Cryptosystem", Abstract of Proceedings of ASIA-CRYPTO '91, 1991, A. Miyaji.

QUOTE

4 Inapplicable case

Definition Let $E/F_q$ be an elliptic curve. If E has the properties $E[p^t] = [\infty]$ for all integer $t \geq 1$, then we say that E is supersingular. Otherwise we say that E is ordinary.

Remark Let E be a supersingular elliptic curve. The definition of supersingular says that o(T) is prime to ch(K)=p for all $T \in E(K)$.

In the following, we denote a finite field $F_q$ by K and fix an elliptic curve E/K and a point $P \in E(K)$. We further assume that o(P)=m is divisible by p=ch(K). From the above remark, it follows that E is ordinary. We will describe EDLP on such a point of an ordinary elliptic curve in the next two subsections.

4-1 Ordinary elliptic curves over $F_{2^r}$

In this subsection, we investigate the case of $q=2^r$. Let m be expressed by $m=2^t k$ (k is an integer prime to 2, t is a positive integer). And EDLP on E to the base P is finding an integer x such that $R=xP$ for given $R \in E(K)$ (section 2).

As we assume that $g.c.d(m, 2) \neq 1$, we can't apply the MOV reduction directly to this case. So we extend the MOV reduction as follows.

The extended reducing method

If all the prime factors of k are small, then we can solve this problem with Pohlig-Hellman's method ([Ko2]). So we assume that k has a large prime factor.

Let $P \propto 0 = 2^t P, R' = 2^t R$. Then in a probablistic polynomial time, we can check whether $R' \in <P'>$ or not ([MOV]). If $R' \in <P'>$, then $R \in <P>$. So we assume that $R' \in <P'>$. Since $o(P')=k$ is prime to 2, we can apply the MOV reduction ([MOV]) to this case. Namely, we can work in a suitable extension field of K and find an integer x' such that $R'=x'P'$. Then we get $2^t(R-x'P)=\infty$. If we assume that $R \in <P>$, we get $(R-x'P) \in <P>$. From the group theory, it follows easily that a finite cyclic group $<P>$ has only one subgroup whose order devices $m=\#<P>$. So we get $(R-x'R) \in <kP>$. Now we change the base P of EDLP into kP, then we have only to find an integer x" such that $R-x'P=x"(kP)$. Since $\#<kP>$ is $2^t$, we can easily find an integer x" with Pohlig-Hellman's method ([Ko2]). So we can find an integer x by setting $x = x'+x"k$ (modulo m).

Now we summarize the extended reducing method as follows.

Condition: Find an integer x such that $R=xP$ for given $R \in E(K)$. Let $m=o(P)$ be expressed by $m=2^t k$ (k is an integer prime to 2, t is a positive integer).

Method: (1) Find a non-trivial subgroup $<2^t P> \subset <P>$ whole order is prime to $p=ch(K)$.

(2) Embed $<2^t P>$ into the multiplicative group of a suitable extension field of K via an injective homorphism constructed by Weil pairing.

(3) Change EDLP on E to the base P into EDLP on E to the base kP. (Since all of the prime factors of $\#<kP>$ are small, we can easily solve such EDLP.)

The above discussion completes the proof of the following.

Theorem1

For any elliptic curve $E/F_{2^r}$ and any point $P \in E(F_{2^r})$, we can reduce EDLP on E (to the base P), in an expected polynomial time, to EDLP that we can apply the MOV reduction to and whose size is same as or less than the original EDLP.

Remark

We proved Theorem1 for a field $F_{2^r}$. We can extend the theorem to a field $F_{p^r}$ if we can generate the tables of the discrete logarithm at most in a polynomial time in the element size.

4-2 Ordinary elliptic curves over $F_p$

In this subsection, we investigate the case of $q=p$. Let p be a large prime and m be expressed by $m=p^t k$ (k is an integer prime to p, t is a positive integer). From Hasse's theorem (section 2), there is a bound of $\#E(K)$. So the integer m must satisfy that $(m-p-1) \leq 2p^{\frac{1}{2}}$.

The next result is easy to prove.

Lemma

Let p be a prime more than 7 and $E/F_p$ be an ordinary elliptic curve. We assume that there is a point $P \in E(K)$ whose order is divisible by p. Then the point P has exactly order p. Furthermore, E(K) is a cyclic group generated by P.

So we try to solve EDLP on the above ordinary elliptic curve, namely an elliptic curve generated by a point of order p. Then non-trivial subgroup of E(K) is only itself and p is a large prime. So we cannot apply the extended reducing method in section 4-1 to it.

We assume that $E(K)=<P>$ can be embedding into the multiplicative group of a suitable extension field K' of K via any way instead of Weil pairing. At this time we can reduce EDLP on E (to the base P) to DLP on $K^r$. But, for any integer r, there is no any subgroup of $K^r$, whose order is p. So we cannot embed $<P>$ into the multiplicative group of any extension field of K.

The next result follows the above discussion.

Theorem2

For an elliptic curve $E/F_p$ such that $\#E(F_p)=p$ and any point $P \neq \infty$ of $E(F_p)$, we cannot reduce EDLP on E (to the base P) to DLP in any extension field $F_{p^r}$ of $F_p$ by any embedding $<P>$ into the multiplicative group of $F_{p^r}$.

5 Constructing elliptic curves

In this section, we describe the method of constructing elliptic curve $E/F_p$ with p elements. In the following, let p be a large prime. We get the next result by Hasse's theorem and Deuring's theorem (section 2).

Lemma

Let k(d) denote the Kronecker class number of d. There exist $d(1-4p)$ elliptic curves $E/F_p$ with p elements, up to isomorphism.

Because of $k(1-4p) \geq 1$, we get that there exists at least one elliptic curve $E/F_p$ with p elements for any given prime p. From the prime distribution, it follows easily that, for primes of O(p), the number of elliptic curves $E/F_p$ with p elements is at least $O(p/\log())$ ([Ri]). Now we mention how to construct such an elliptic curve $E/F_p$. Original work concerning this was done by Deuring ([La2], [At-Mo], [Mo]). In the following, we explain the essence of his work.

Let d be an integer such that $4p-1=b^2d$ (b is an integer). Then there is a polynomial $P_d(x)$ called class polynomial. For a definition of the class polynomial, see [La2], [At-Mo].

The class polynomial $P_d(x)$ has the following properties.

(c-1) $P_d(x)$ is a monic polynomial with integer coefficients.

(c-2) The degree of $P_d(x)$ is the class number of an order $O_d$ of an imaginary quadratic field.

(For a definition of the order, see [Sil] and for the class number, see [La1]).

(c-3) $P_d(x)=0$ splits completely modulo p.

Let $j_0$ be a root of $P_d(x)=0$ (modulo p). Then $j_0$ gives the j-invariant of an elliptic curve $E/F_p$ with p elements. So we make an elliptic curve $E/F_p$ with j-invariant $j_0$ as we mentioned in section 2, and one of twists of $E/F_p$ is an elliptic curve with p elements. Next we discuss how to find such curves among all twists in a practical way.

Decide which twists of $E/F_p$ has an order p

For any twist $E_1$ of $E/F_p$ with j-invariant $j_0$, fix any point $X_1 \neq \infty$ of $E_t(F_p)$ and calculate $pX_t$. If $pX_t = \infty$, then $E_t(F_p)$ has exactly p elements. This follows the section 4-2. For any give elliptic curve $E/F_p$ has an order p in a polynomial time of the element size.

Good d and good p

For a given large prime p, we can construct an elliptic curve $E/F_p$ as we mentioned above. What prime p and integer d such that $4p-1=b^2d$ (b is an integer) are good for constructing such as elliptic curve? We will find a prime p and an integer d such that the order $O_d$ has a small class number. Because if the order $O_d$ has a large class number, the degree of $P_d(x)$ is large and it is cumbersome to construct $P_d(x)$.

Procedure for constructing an elliptic curve

We can construct an elliptic curve by the following algorithm.

Algorithm (p-1) Choose an integer d such that the order $O_d$ has a small class number from a list ([Ta]).

(p-2) Find a large prime p such that $4p-1=b^2d$ for an integer b.

(p-3) Calculate a class polynomial $P_d(x)$.

(p-4) Let $j_0 \epsilon F_p$ be one root of $P_d(x)=0$ (modulo p).

(p-5) Construct an elliptic curve $E/F_p$ with j-invariant $j_0$.

(p-6) Construct all twists of $E/F_p$.

(p-7) For any twist $E_t$ of $E/F_p$, fix any point $X_1 \neq \infty$ of $E_1(F_p)$ and calculate $pX_1$. If (p-8) $pX_t=\infty$, then $E_t(F_p)$ has exactly p elements.

[At-Mo] A. O. L. Atkin and F. Morain, "Elliptic curves and primality proving", Research Report 1256, INRIA, Julin 1990. Submitted to Math. Comp.

[Ko2] N. Koblitz, "A course in Number Theory and Cryptography", GTM114, Springer-Verlag, New York(1987)

[La1] S. Lang, "Algebraic Number Theory", GTM110, Springer-Verlag, New York (1986).

[La2] S. Lang, "Elliptic Functions", Addison-Wesley, 1973.

[Mo] F. Morain, "Building cyclic elliptic curves modulo large primes", Abstracts for Eurocrypto91, Bringhton, U.K. 160-164.

[MOV] A. Menezes, S. Vanstone and T. Okamoto, "Reducing elliptic curve logarithms to logarithms in a finite field", to appear in Proc. STOC'91.

[Ri] P. Ribenboim, "The book of prime number records", Springer-Verlag, New York, 1988.

[Ta] T. Takagi, "Syotou seisuuronn kougi", Kyourim Syuppan.

UNQUOTE

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DESCRIPTION OF THE PREFERRED EMBODIMENTS (Embodiment I)

Figure 1:
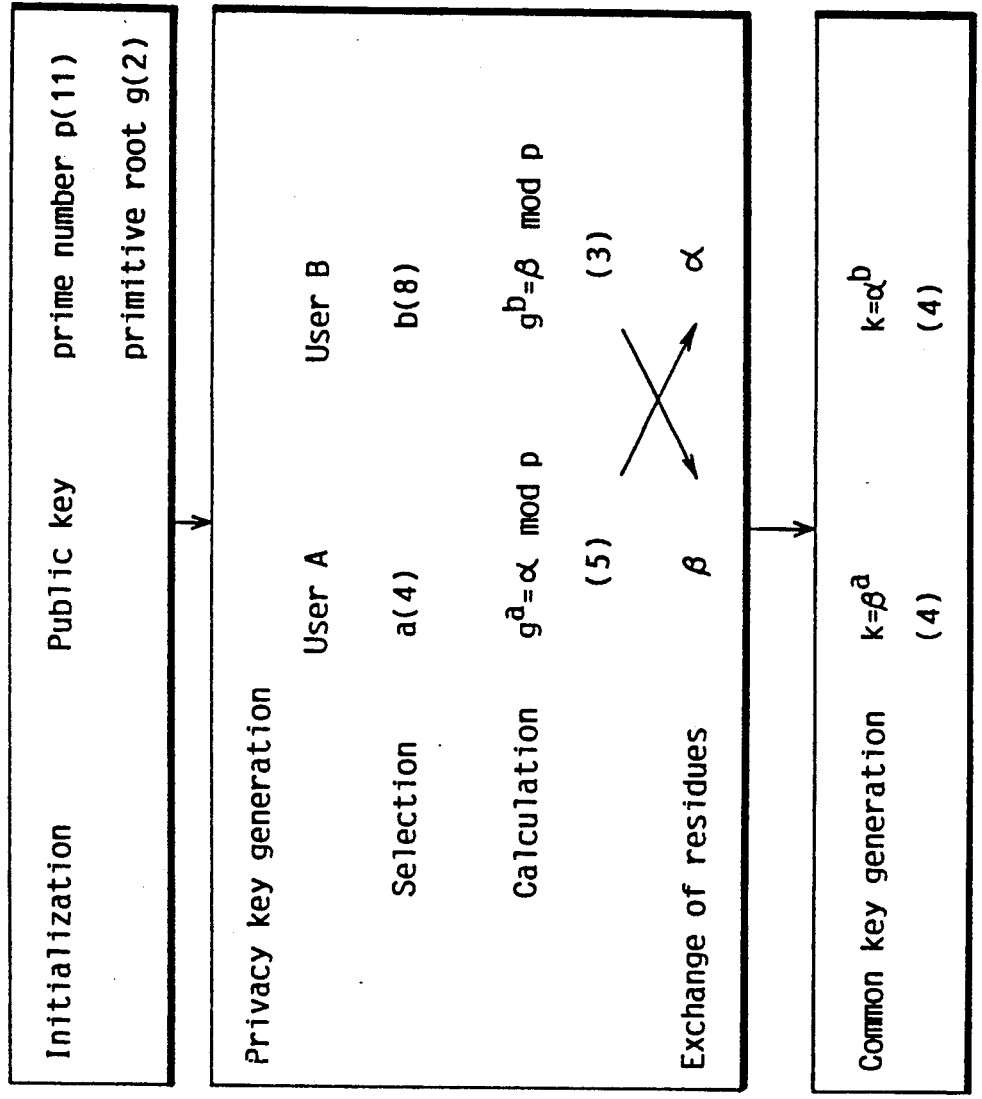
FIG. 1 is a chart showing the procedures of a privacy communication.
Figures 2, 3:
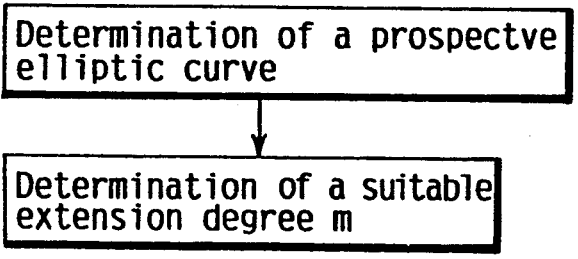
FIG. 2 is a view explaining ciphering methods.
FIG. 3 is a chart explaining a method to construct an elliptic curve of Example 1 in Related Arts.
Figure 4:
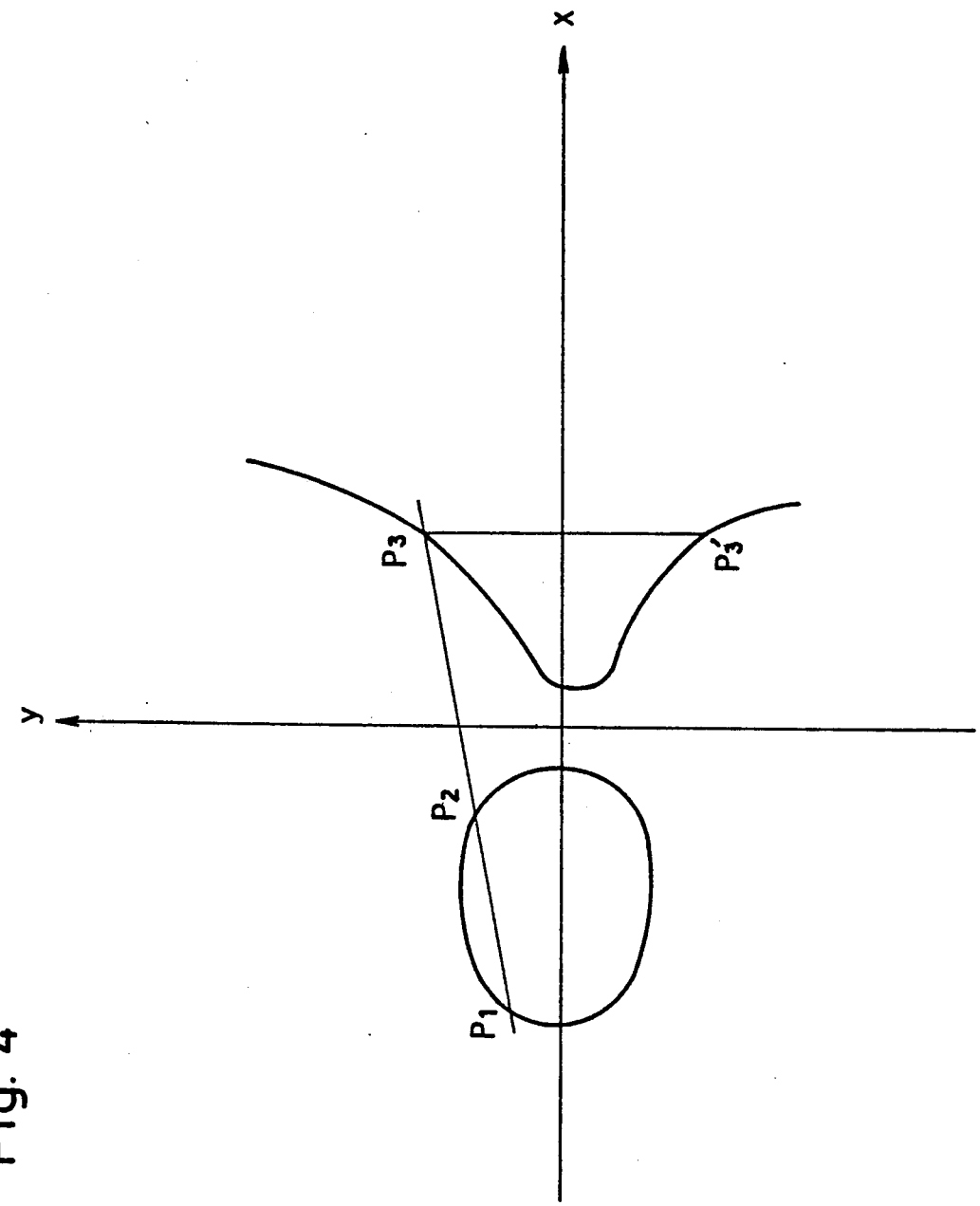
FIG. 4 is a view explaining an addition of a group on an elliptic curve.
Figure 5:
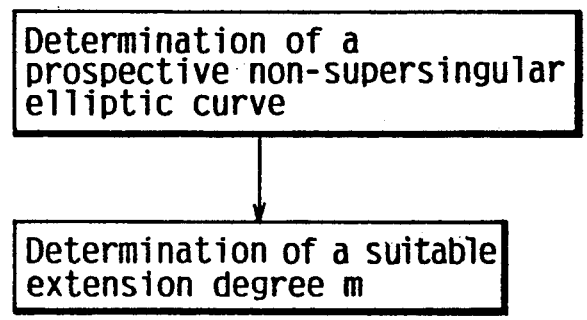
FIG. 5 is a chart explaining a method to construct an elliptic curve of Example 2 in Related Art.
Figure 6:
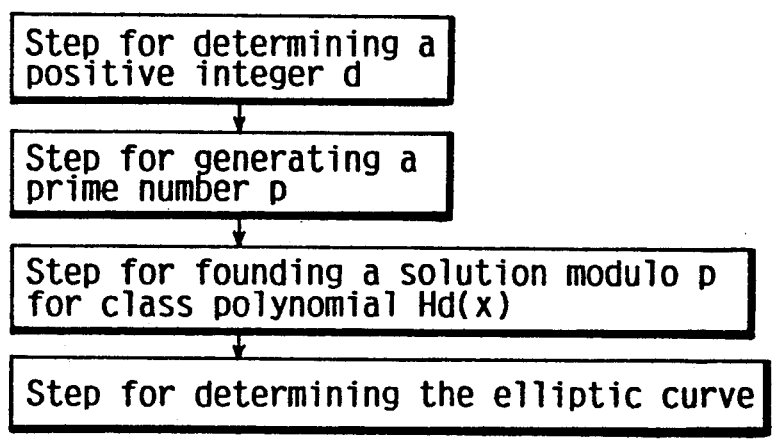
FIG. 6 is a chart explaining a method to construct a public key cryptosystem with an elliptic curve in Embodiment I.

With referring to FIG. 6, a public key cryptosystem with an elliptic curve of the present invention is described taking followings steps of;

1) determining a positive integer d;
2) generating a prime number p;
3) founding a solution modulo p for the class polynomial $H_d(x)$;
4) determining an elliptic curve Definition of an imaginary quadratic field and a class number(ideal number) which are used in the 4 steps is omitted, since "VORLESUNGEN UEBER ZAHLEN THEORIE" and "Algebraic Number Theory", S. Lang GTM110, Springer-Verlag, New York 1986, include detailed explanation of these. Also definition of the class polynomial and a j-invariant which are used in the 4 steps is omitted. The detailed explanation is in "Elliptic Functions", S. Lang, Addison-Wesley, 1973.

1) Determining a positive integer d

Let d be a positive integer such that gives an imaginary quadratic field $Q((-d)^{\frac{1}{2}}))$ a small class number. In the embodiment, d is 19 and class number is 1 in order to simplify the succeeding steps. (For the class number 1, d may be 1, 2, 3, 7, 11, 43, 67, or 163. For class number 2, d may be 10, 15, 26, or 30. Although, myriads books for the theory of number explains various quadratic fields, all the quadratic fields are not applicable to the present invention. For instance, let $d=1, 2, 7$, then no such prime number that $4*p-1=d*$square number exists.)

2) Generating a prime number p

Let p be a prime number such that $4*p-1=d*$square number.

For instance, let p=235208607464683519348918441623, then, $4*p-1=19*(1451*48496722383)^2$.

Since it is easy to find a prime number having more than or equal to 30 digits, a prime number such that $4*p-1=d*$square number can be found after repeated trial and error. G. H. Hardy hypothesized that assuming n as a sufficiently large integer, the number of prime number less or equal to n would be $O(n^{\frac{1}{2}}/\log n)$ when d is fixed.

3) Founding a solution modulo p for the class polynomial H(x)

Let $d=19$ then, $H_{19}(x)=x+884736$ thus, $x \equiv -884736 \pmod{p}$

4) Determining an elliptic curve

The elliptic curves over GF(p) with a solution $-884736$ of $H_d(x)$ modulo p as the j-invariant modulo GF(p)-isomorphism is expressed as:

$E_1$:
$y^2=x^3+185691005893171199485988223307x+99035203143024639725860386382$ $E_2$:
$y^2=x^3+185691005893171199485988223307x+13617340432165887962305802991$

The element of #$E_i$(GF(p)) must be p, and another element of #$E_i$(GF(p)) must be $p+2(i=1,2)$. Given these conditions, finding an order of a point other than a zero element from each $E_i$(GF(p)) makes it possible to determine the elliptic curve, because the one having exactly order p is the elliptic curve with p elements. In other words, when an element multiplied with p becomes the zero element, such an element has exactly order p.

As a result, it is proved that the MOV reduction can not be applied to EDLP having the base point other than the zero element over $E_1(GF(p))$, because $\#E_1(GF(p))$ and p are not relatively prime.

Therefore, having reliability based on the difficulty in EDLP on $E_1(GF(p))$ enables the public key cryptosystem to increase the speed while maintaining reliability.

If the elliptic curve is constructed on the finite abelian group with conventional method, since the elliptic curves on GF(2) are extended to the elliptic curves on $GF(2^n)$, the number of the available elliptic curves in the field of definition having n-bit is limited and factorization with a large number is required, which is rather time consuming. While in the present invention, since the elliptic curve is constructed on a prime number p, the number of the available elliptic curves in the field of definition having n-bit is more than the number of prime numbers having n-bit, or more than $2^n/n$, and factorization is not necessary because $\#E_1(GF(p))=p$ when $E_1$ on $(GF(p))$ is given.

Although d=19 in Embodiment I, d may be any positive integer such that give $Q((-d)^{\frac{1}{2}})$ a small class number, and p is not necessarily the same as the one in Embodiment I.

In the followings, 4 other examples are shown.

1) Let d = 11
thus,
p = 1000000000000069784500614201619
$4p-1 = 11*1906925178491185^2$
then,
$H_{11}(x) = x + (2^5)^3$
thus, $x = -(2^5)^3$
therefore,
$E_1:y^2 =$
$x^3 + 646582192025387235466738614 91x + 617190295194809357160578526 4$
$G_1 = (0,686518358397787478040658432 8)$
$E_2:y^2 =$
$x^3 + 442350729387578836099258670 87x + 805264725178723614921944554 88$
$G_2 = (166975881261712070594717590 83,505581352122918828140451642 47)$
thus, $E_1$ is the elliptic curve with p elements.

2) Let d = 43
thus,
p = 1000000000000067553784390207169
$4p-1 = 43*96448564434115^2$
then,
$H_{43}(x) = x + (2^6*3*5)^3$
thus, $x = -(2^6*3*5)^3$
therefore,
$E_1:y^2 =$
$x^3 + 245577544675369217579548184 21x + 404105895734497823676602193 53$
$G_1 = (265854949502231348884545659 43,312091830435595741705234042 21)$
$E_2:y^2 =$
$x^3 + 698664617515240106023184199 04x + 170271757093131236261754889 22$
$G_2 = (0,223748482144814142598116785 18)$
thus, $E_1$ is the elliptic curve with p elements.

3) Let d = 67
thus,
p = 1000000000000039914906156290257
$4p-1 = 67*7726674092864 1^2$
then,
$H_{67}(x) = x + (2^5*3*5*11)^3$
thus, $x = -(2^5*3*5*11)^3$
therefore,
$E_1:y^2 =$
$x^3 + 980221791528701009418035775 4x + 868725433423597463812247188 25$
$G_1 = (872078361287933066631030948 84,623972422806656626845428667 84)$
$E_2:y^2 =$
$x^3 + 406461607537950933330954792 25x + 644408280190961124766248947 92$
$G_2 = (0,235871587624849876745893794 28)$
thus, $E_2$ is the elliptic curve with p elements.

4) Let d = 163
thus,
p = 1000000000000088850197895528571
$4p-1 = 163*49537740461829^2$
then,
$H_{163}(x) = x + (2^6*3*5*23*29)^3$
thus, $x = -(2^6*3*5*23*29)^3$
therefore,
$E_1:y^2 =$
$x^3 + 695398375530858856440294407 81x + 218021029362593423479110852 54$
$G_1 = (0,129719387050519170835190035 4586)$
$E_2:y^2 =$
$x^3 + 435316280575131977978239227 59x + 635877365577786970313712523 31$
$G_2 = (272295868705069338357958923 72,770215841726736966061910910 4)$ -continued thus, $E_2$ is the elliptic curve with p elements.

(Embodiment II)

Figure 7:
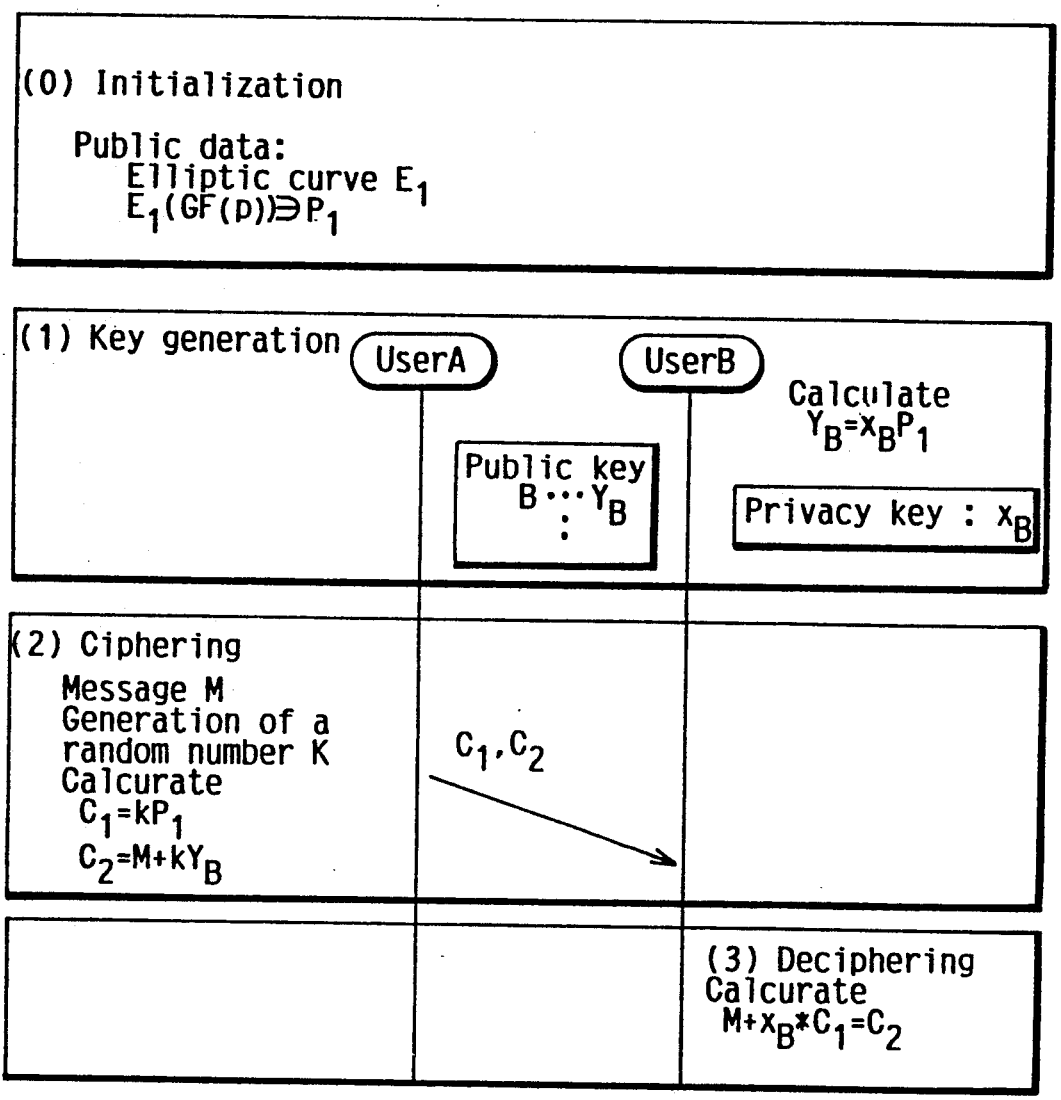
FIG. 7 is a chart explaining a method to construct a public key cryptosystem with an elliptic curve in Embodiment II.

Embodiment II explains an example of Embodiment I when it is applied to the public key cryptosystem with an elliptic curve using ElGamal cryptography with referring FIG. 7. "A Course in Number Theory and Cryptography" includes the explanation of the ElGamal cryptography using the elliptic curve in general. Let $E_1$ and $E_1(GF(p)) \ni P_1$ be examples of Embodiment I.

1) Initialization
Let $E_1$ and $P_1$ be the public data.
2) Public key generation
Having selected an integer $x_B$, the user B proceeds the calculation $$Y_B = x_B P_1 \qquad [1]$$

then, withholds $x_B$ as a privacy key while informs $Y_B$ as a public key to the other users.
3) Ciphering
Suppose the user A sends a message M to the user B through the privacy communication.
Having secretly selected a random number k, the user A produce two sets of cryptography $C_1$ and $C_2$ from M using k and $Y_B$.
Thus, $$C_1 = kP_1 \qquad [2]$$

$$C_2 = M + kY_B \qquad [3]$$

Then, the user A sends $C_1$ and $C_2$ to the user B.
4) Deciphering
Having received $C_1$ and $C_2$, the user B finds M using $$M + x_B C_1 = C_2 \to \qquad [4]$$

It is to be noted that all expressions [1], [2], [3], and [4] are proceeded in $E_1(GF(p))$, and M, $Y_B$, and $P_1$ are elements of $E_1(GF(p))$.

The reliability of the public key cryptosystem depends on difficulty of EDLP over $E_1(GF(p))$ having its element $P_1$ as the base point. Since $\#E_1(GF(p))$ and p are not relatively prime, the MOV reduction can not be applied to such EDLP, therefore, making it possible for the public key cryptosystem to increase the speed while maintaining reliability.

For the calculation between one demential data and quadratic data, or a random number and an element of elliptic curve $C_1(r_x, r_y)$, $r_x$ of $C_1(r_x, r_y)$ is used. In addition, other data are provided so that $C_1(r_x, r_y)$ are deciphered with $r_x$.

For instance, taking advantage of $r_y = \pm(r_x^3 + a^* r_x + b)^{q+1}$, or Fermat's theorem, $cu(C_1)$ is used with pre-assigned condition as follows:
If the sign of the formula is $-$, $cu(C_1) = 1$
If the sign of the formula is $+$, $cu(C_1) = 0$ (EMBODIMENT III)

Embodiment III explains an example of Embodiment I when it is applied to another cryptography. Message M is ciphered by adding M and the common key as was explained as the second ciphering method in Related art.

Figure 8:
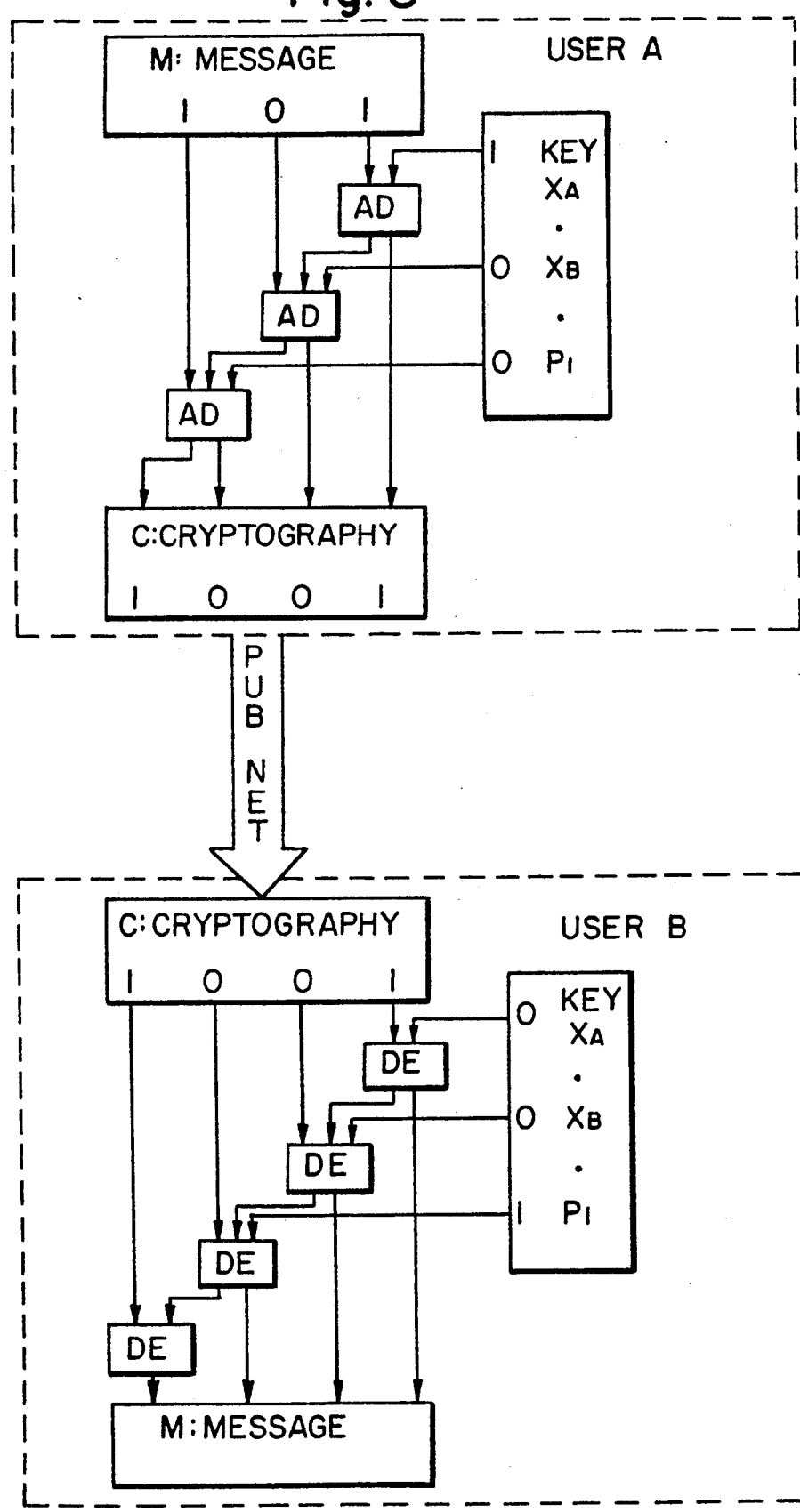
FIG. 8 is a view showing the procedure of ciphering and deciphering a message.

Let $E_1$ and $P_1$ be the public data like in Embodiment II. The user A withholds a privacy key $x_A$, and calculates a public key $Y_A$ using $Y_A = x_A \cdot P_1$ to notify $Y_A$ to the user B. Meanwhile, the user B withholds a privacy key $x_B$, and calculates a public key $Y_B$ using $Y_B = x_B \cdot P_1$ to notify $Y_B$ to the user A. Thus, $x_Z x_B P_1$ is used as the common key. The message M expressed in the binary notation is transmitted after $x_A x_B P_1$ is added thereto ($C = M + x_A x_B P_1$). The message M is deciphered by subtracting $x_A x_B P_1$ from the received message ($M = C - x_A x_B P_1$). FIG. 8 shows the procedure of ciphering and deciphering the message using the common key generated with $X_A$, $Y_B$, and $P_1$. This procedure is carried out after the construction of a public key cryptosystem with an elliptic curve as is explained by referring to FIG. 7. In the drawing, the message is "101", and a key of $X_A \cdot X_{B \cdot P_1}$ is $r_y$ of $kY_B(r_x, r_y)$, which is "100". Although a 3-digit key is used herein for the explanation's convenience, a 54- or more-bit key is used practically.

(Embodiment IV)

Embodiment IV explains an example of Embodiment III when it is applied to STV. In this case, the common key $x_A x_B P_1$ has been previously set in a circuit of a key for compact deciphering units installed at the end of subscribers who have already paid the charges. Then a broadcasting station transmits C. Having received C, the deciphering units easily find M with $M = C - x_A x_B P_1$, and forward M to receivers.

In every term, for instance, one month, $x_A x_B P_1$ is replaced. In other words, the broadcasting station provides new keys to the subscribers who have paid the charges at the renewal while it transmits replaced $x_A x_B P_1$, therefore, making it impossible to decipher the data unless one pays the charges. In addition, by replacing the new key with the old one makes it easy for the subscribers to replace the privacy key and common key.

(Embodiment V)

Embodiment V explains an example of Embodiment III when it is applied to the loaning of data storage media in jetliners. $x_A x_B P_1$ has been previously set in a key for a key slot of compact television sets equipped with a microcomputer and a VTR installed in the seats. The key slot is sealed so that the key is not removed unless passengers remove the whole sets or break the sets. C are stored in the image data storage media, which are loaned to passengers. Having been set such image data storage media, the microcomputers finds M with $M = C - x_A x_B P_1$, then forward M to the compact television set, enabling the passengers to watch the data.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A method of applying a public key encryption network system to users from a provider by using an elliptic curve, comprising the steps of:

supplying on the network system public data to each of the users from the provider;

selecting a first privacy key at a terminal of a first user and selecting a second privacy key at a terminal of a second user wherein the first and second privacy keys are different;

notifying a number calculated with the public data and the first privacy key to the second user from the first user, and notifying a number calculated with the public data and the second privacy key to the first user from the second user;

calculating a common key by using the first privacy key and the number from the second user at the site of the first user, and calculating the common key by using the second privacy key and the number from the first user at the site of the second user;

ciphering data to be transmitted using the common key at a site of one of the first and second users; and deciphering the ciphered data using the common key at the site of other user, wherein the step of supplying public data includes the steps of:

choosing d as a positive integer such that it gives an imaginary quadratic field $Q(-d)^{\frac{1}{2}}$ a small class number, choosing p as a prime number such that $4*p-1=d*$square number, so that an elliptic curve E having GF(p) as a field of definition will have a j-invariant as a solution modulo p for a class polynomial $H_d(x)=0$ which is filed by d;

finding an order of a point other than a zero element from a group consisting of the elements of GF(p) denoted as $E_1(GF(p))$;

choosing an elliptic curve E over GF(p) having exact p order; and choosing an element other than the zero element of E(GF(p)) as a base point.

2. The method of claim 1, wherein 1 is a class number for the imaginary quadratic field $Q((-d^{\frac{1}{2}})$.

3. A secure communication network system for transmitting data with a plurality of elliptic curves, comprising:

means for enciphering a data message for each user of the network system;

means for deciphering the data message for each user of the network system;

means for generating an identity data code for each user and exchanging the same with a network provider to create individual enciphering keys between the network provider and each user; and means for communicating the data message over the network including enciphering the data message with a user enciphering key with a first elliptic curve, deciphering the data message by the network provider with the same enciphering key and re-enciphering the data message with a second elliptic curve and transmitting it to another user by use of that user's enciphering key.

4. A method of privacy communication over a television subscriber network between a program supplier and individual users, comprising the steps of:

providing a communication network to a plurality of users;

providing data of an elliptic curve E and an element p, to each user who wishes to receive communications over the network;

the users exchanging with the program supplier an enciphering key which combines the elliptic curve E, element p and a predetermined value known only to the user and the program supplier whereby the program supplier creates an individual enciphering key for each user constructed by an algorithm with E (GF(p)) whose number of elements is exactly p, assuming that p is a prime number and E(GF(p)) is a group of elements of GF(p) on the elliptic curve E; communicating a communication enciphered with said key over the network.

5. The method of claim 4 wherein the algorithm includes defining d as a positive integer in such a manner to provide an imaginary quadratic field $Q((-d^{\frac{1}{2}})$ with a small class number;

finding a prime number p such that $4*p-1=d*$square number; and finding a solution of a class polynomial $H_d(x)=0$ modulo p that is defined by d and given with a j-invariant.

6. A method of claim 5, wherein said elliptic curve is given 1 as the class number.

* * * * *